United States Patent
Honda (10) Patent No.: US 11,491,824 B2
(45) Date of Patent: Nov. 8, 2022

(54) PNEUMATIC TIRE

(71) Applicant: The Yokohama Rubber Co., LTD., Tokyo (JP)

(72) Inventor: Hiroaki Honda, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 0 days.

(21) Appl. No.: 17/048,546

(22) PCT Filed: Apr. 9, 2019

(86) PCT No.: PCT/JP2019/015489
§ 371 (c)(1),
(2) Date: Oct. 16, 2020

(87) PCT Pub. No.: WO2019/203066
PCT Pub. Date: Oct. 24, 2019

(65) Prior Publication Data
US 2021/0086562 A1 Mar. 25, 2021

(30) Foreign Application Priority Data
Apr. 17, 2018 (JP) .............................. JP2018-078938

(51) Int. Cl.
*B60C 11/11* (2006.01)
*B60C 11/03* (2006.01)
*B60C 11/13* (2006.01)

(52) U.S. Cl.
CPC ...... *B60C 11/0306* (2013.01); *B60C 11/0302* (2013.01); *B60C 11/13* (2013.01);
(Continued)

(58) Field of Classification Search
CPC ......... B60C 11/0302; B60C 2011/0313; B60C 2011/0348
See application file for complete search history.

(56) References Cited

U.S. PATENT DOCUMENTS 6,003,575 A * 12/1999 Koyama ................. B60C 11/12
152/209.27
2003/0019555 A1* 1/2003 Nakagawa .......... B60C 11/0302
152/209.18
(Continued)

FOREIGN PATENT DOCUMENTS

EP 3 231 639 10/2017
JP 2003-080907 * 3/2003
(Continued)

OTHER PUBLICATIONS

English machine translation of JP2003-080907. (Year: 2003).*
(Continued)

*Primary Examiner* — Robert C Dye
(74) *Attorney, Agent, or Firm* — Thorpe North & Western (57) ABSTRACT

A pneumatic tire includes lug grooves having alternating first and second groove portions. The first groove portion intersects an equator, extends in a width direction, and communicates with an adjacent second groove portion. The second groove portion inclines from the first groove portion at a smaller angle relative to a circumferential direction smaller than that of the first groove portion and extends to a tread edge on one side. The first groove portion is on a stepping side with respect to an end on the tread edge side. The second groove portions curve or bend and have an average angle in an inner region smaller than that of the second groove portions in an outer region. A maximum length in the width direction of center blocks defined by narrow grooves connecting adjacent second groove portions and the lug grooves is 25%-35% of a development width.

13 Claims, 3 Drawing Sheets (52) U.S. Cl.
CPC ......... *B60C 2011/0313* (2013.01); *B60C 2011/0348* (2013.01); *B60C 2011/0355* (2013.01)

(56) References Cited

U.S. PATENT DOCUMENTS

| | | | | |
|---|---|---|---|---|
| 2011/0088822 | A1* | 4/2011 | Collette | B60C 11/1643 152/210 |
| 2011/0178233 | A1 | 7/2011 | Chaboche et al. | |
| 2013/0192732 | A1 | 8/2013 | Itoi | |
| 2015/0321518 | A1* | 11/2015 | Katayama | B60C 11/12 152/209.18 |
| 2016/0297249 | A1* | 10/2016 | Ishino | B60C 11/0302 |
| 2017/0297379 | A1 | 10/2017 | Higashiura | |
| 2018/0056727 | A1* | 3/2018 | Iwata | B60C 11/0332 |
| 2018/0111421 | A1* | 4/2018 | Nagasawa | B60C 11/12 |
| 2018/0312008 | A1 | 11/2018 | Saeki | |
| 2020/0114699 | A9 | 4/2020 | Higashiura | |

FOREIGN PATENT DOCUMENTS

| | | |
|---|---|---|
| JP | 2010-174231 | 8/2010 |
| JP | 4676959 | 4/2011 |
| JP | 2013-136333 | * 7/2013 |
| JP | 2013-136333 A | 7/2013 |
| JP | 2015-057499 | 3/2015 |
| JP | 2015-134577 | 7/2015 |
| JP | 2016-199120 | 12/2016 |
| JP | 2017-039408 | 2/2017 |
| JP | 2017-128217 | 7/2017 |
| WO | WO 2009/133068 | 11/2009 |
| WO | WO 2012/046724 | 4/2012 |
| WO | WO 2015/174477 | 11/2015 |
| WO | WO 2016/204004 | 12/2016 |

OTHER PUBLICATIONS

English machine translation of JP2013-136333. (Year: 2013).*
English machine translation of JP2017-128217. (Year: 2017).*
English machine translation of JP2010-174231. (Year: 2010).*
International Search Report for International Application No. PCT/JP2019/015489 dated Jul. 16, 2019, 4 pages, Japan.

* cited by examiner

PNEUMATIC TIRE

TECHNICAL FIELD

The present technology relates to a pneumatic tire suitable as a heavy duty pneumatic tire and in particular relates to a pneumatic tire that improves low noise performance while improving driving performance on unpaved roads.

BACKGROUND ART

Heavy duty pneumatic tires used in construction vehicles, such as dump trucks, are required to mainly have excellent driving performance (traction performance) on unpaved roads. Therefore, a block-based tread pattern including a large number of lug grooves extending in a tire width direction is employed (see, for example, Japan Patent No. 4676959).

Meanwhile, performances requested to various tires have been recently increasing, and the tires as described above are requested to improve tire performance (for example, low noise performance) on paved roads, in addition to the driving performance on unpaved roads. Thus, there is a demand for a countermeasure to improve low noise performance while improving the traction performance on unpaved roads.

SUMMARY

The present technology provides a pneumatic tire with improved low noise performance while improving driving performance on unpaved roads.

A pneumatic tire according to an embodiment of the present technology in which a rotation direction is designated includes a tread portion, a pair of sidewall portions, and a pair of bead portions. The tread portion extends in a tire circumferential direction and forms an annular shape. The pair of sidewall portions are disposed on both sides of the tread portion. The pair of bead portions are disposed inward of the sidewall portions in a tire radial direction. Lug grooves that extend inward in a tire width direction from a tread edge on one side of a tire equator and intersect with the tire equator and lug grooves that extend inward in the tire width direction from a tread edge on another side of the tire equator and intersect with the tire equator are arranged in alternation in a tire circumferential direction on an outer surface of the tread portion. The respective lug grooves include first groove portions and second groove portions. The first groove portion intersects with the tire equator and extends along the tire width direction. The second groove portion is inclined from one end of the first groove portion at an angle with respect to the tire circumferential direction smaller than an angle of the first groove portion with respect to the tire circumferential direction and extends to the tread edge. The first groove portion has another end communicating with the second groove portion of the lug groove adjacent in the tire circumferential direction. The first groove portion is located on a stepping side with respect to an end portion on the tread edge side of the lug groove. When a distance from the tire equator to the tread edge in the tire width direction is denoted as W, a region between a position separated by 0.50 W in the tire width direction from the tire equator and the tire equator is referred to as an inner region, and a region between the position separated by 0.50 W in the tire width direction from the tire equator and the tread edge is referred to as an outer region, the second groove portions are curved or bent such that an average angle of the second groove portions with respect to the tire circumferential direction in the inner region becomes smaller than an average angle of the second groove portions with respect to the tire circumferential direction in the outer region. Circumferential narrow grooves that connect the mutual second groove portions adjacent in the tire circumferential direction on the one side or the other side of the tire equator are formed. Center blocks are defined at positions intersecting with the tire equator by the lug grooves and the circumferential narrow grooves. A maximum length in the tire width direction of the center block is from 25% to 35% of a development width.

In the embodiment of the present technology, as described above, the lug grooves formed of the first groove portions and the second groove portions are provided, so while traction performance on unpaved roads is improved, low noise performance can be improved. In other words, the first groove portions extending along the tire width direction are disposed at or near the tire equator where a contribution to traction performance is large and the first groove portions communicate with the other lug grooves (second groove portions). Accordingly, traction performance can be efficiently improved. Additionally, the second groove portions that curve or are bent as described above allow increasing groove lengths. This allows improving traction performance and suppressing air column resonance. Furthermore, because a maximum width of the center blocks is appropriately ensured, block rigidity can be sufficiently ensured, and good traction performance can be exhibited. Additionally, providing the circumferential narrow grooves disperses noise through the circumferential narrow grooves, thereby ensuring improving low noise performance. Additionally, the circumferential narrow grooves allow adding a groove component in the tire circumferential direction, and thus a lateral displacement of the tire at traction is reduced and stability can be improved.

In the embodiment of the present technology, an angle of the first groove portion with respect to the tire circumferential direction is preferably from 80° to 100°. This allows disposing the grooves extending in a direction substantially perpendicular to the tire circumferential direction at or near the tire equator where the contribution to traction performance is large and allows effectively improving traction performance.

In the embodiment of present technology, the following is preferable. The average angle of the second groove portions with respect to the tire circumferential direction in the inner region is from 35° to 45°. The average angle of the second groove portions with respect to the tire circumferential direction in the outer region is from 70° to 85°. Accordingly, the angles of the second groove portions in the respective portions are in the appropriate ranges and curved or bent shapes of the second groove portions become good. Accordingly, lug groove lengths are increased, which is advantageous in suppressing air column resonance while improving traction performance.

In the embodiment of the present technology, the following is preferable. The circumferential narrow groove is present at an extended position of the first groove portions. A difference between an average angle of the second groove portions with respect to the tire circumferential direction in the inner region and an inclination angle of the circumferential narrow groove with respect to the tire circumferential direction is within a range 90°±10°. Thus, since the circumferential narrow grooves extend substantially perpendicular to the lug grooves, a balance between the lug grooves and the circumferential narrow grooves is excellent, which is advantageous in reducing a lateral displacement of the tire at traction.

In the embodiment of present technology, the following is preferable. A groove depth of the first groove portion of the lug groove is from 65% to 75% of a groove depth of the second groove portion. By adequately shallowing the first groove portion more than the second groove portion in this manner, the rigidity of the block adjacent to the first groove portion can be increased, which is advantageous in improving traction performance.

In the embodiment of present technology, the following is preferable. A groove depth of the circumferential narrow groove is from 75% to 85% of a groove depth of the second groove portion of the lug groove. By adequately shallowing the circumferential narrow groove more than the second groove portion of the lug groove in this manner, the rigidity of the block adjacent to the circumferential narrow groove can be increased, which is advantageous in improving traction performance.

In the embodiment of present technology, the following is preferable. The lug groove has a groove depth from 15 mm to 25 mm. Additionally, the following is preferable. A tread rubber constituting the tread portion has JIS (Japanese Industrial Standard)—A hardness from 61 to 70 and a modulus at 100% elongation from 2.0 MPa to 3.0 MPa. The embodiment of the present technology allows exhibiting excellent performance especially in traction performance, uneven wear resistance performance, and low noise performance in a heavy duty pneumatic tire having such characteristics. Note that in the embodiment of the present technology, the "JIS-A hardness" is hardness measured using a type A durometer at a temperature of 23° C. in accordance with the durometer hardness test regulated in JIS K6253. Additionally, the "modulus at 100% elongation" is a value measured under respective conditions of a tensile speed of 500 mm/minute and a temperature of 23° C. using a No. 3 dumbbell test piece in accordance with JIS K6251.

In the embodiment of the present technology, the "tread edges" refer to both ends of a tread-patterned part of the tire when the tire is mounted on a regular rim, inflated to a regular internal pressure, and unloaded (unloaded state). The "distance W from the tire equator to the tread edge in the tire width direction" in the embodiment of the present technology is equivalent to ½ of a developed tread width ("tread width" specified by JATMA (The Japan Automobile Tyre Manufacturers Association, Inc.)) that is a linear distance between the tread edges measured along the tire width direction in the state described above. "Regular rim" is a rim defined by a standard for each tire according to a system of standards that includes standards on which tires are based, and refers to a "standard rim" in the case of JATMA, refers to a "design rim" in the case of TRA (The Tire and Rim Association, Inc.), and refers to a "measuring rim" in the case of ETRTO (The European Tyre and Rim Technical Organisation). In the system of standards, including standards with which tires comply, "regular internal pressure" is air pressure defined by each of the standards for each tire and is referred to as "maximum air pressure" in the case of JATMA, the maximum value being listed in the table "TIRE ROAD LIMITS AT VARIOUS COLD INFLATION PRESSURES" in the case of TRA, and is "INFLATION PRESSURE" in the case of ETRTO. However, "regular internal pressure" is 180 kPa in a case where a tire is a tire for a passenger vehicle.

DETAILED DESCRIPTION

Configurations of embodiments of the present technology will be described in detail below with reference to the accompanying drawings.

Figure 1:
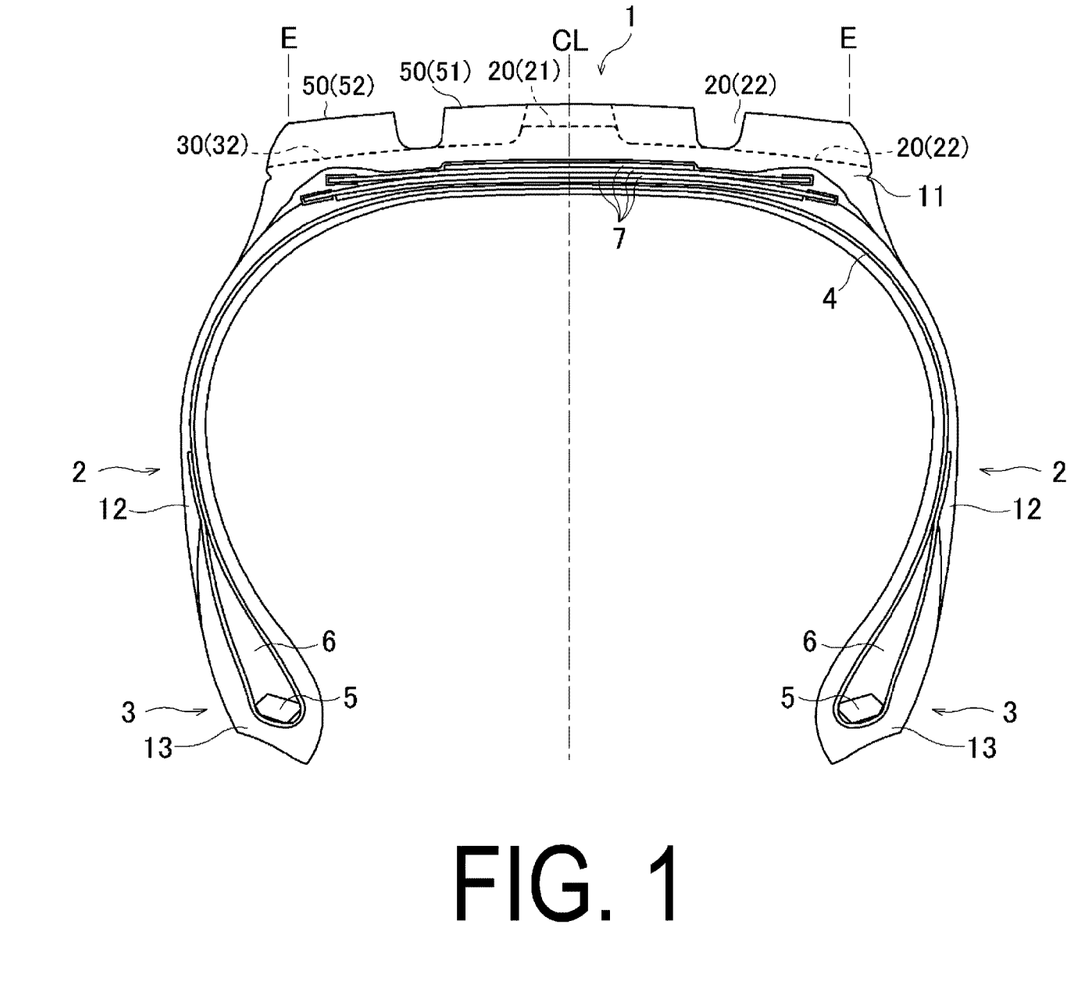
FIG. 1 is a meridian cross-sectional view of a pneumatic tire according to an embodiment of the present technology.

As illustrated in FIG. 1, a pneumatic tire of an embodiment of the present technology includes a tread portion 1, a pair of sidewall portions 2 disposed on both sides of the tread portion 1, and a pair of bead portions 3 disposed inward of the sidewall portions 2 in a tire radial direction. In FIG. 1, reference sign "CL" denotes a tire equator, and reference sign "E" denotes a tread edge. In the illustrated example, the tread edges E match with edges outward in a tire width direction of blocks outermost in the tire width direction (edge portions formed by road contact surfaces of the blocks outward in the tire width direction and side surfaces outward in the tire width direction). Although not illustrated in FIG. 1 as FIG. 1 is a meridian cross-sectional view, the tread portion 1, the sidewall portions 2, and the bead portions 3 each extend in a tire circumferential direction to form an annular shape. Thus, a toroidal basic structure of the pneumatic tire is configured. Although the description using FIG. 1 is basically based on the illustrated meridian cross-sectional shape, all of the tire components each extend in the tire circumferential direction and form the annular shape.

A carcass layer 4 is mounted between the left-right pair of bead portions 3. The carcass layer 4 includes a plurality of reinforcing cords extending in the tire radial direction, and is folded back around a bead core 5 disposed in each of the bead portions 3 from a vehicle inner side to a vehicle outer side. Additionally, bead fillers 6 are disposed on the periphery of the bead cores 5, and each bead filler 6 is enveloped by a main body portion and a folded back portion of the carcass layer 4. On the other hand, in the tread portion 1, a plurality of belt layers 7 (four layers in FIG. 1) are embedded on an outer circumferential side of the carcass layer 4. The belt layers 7 each include a plurality of reinforcing cords that are inclined with respect to the tire circumferential direction, with the reinforcing cords of the different layers arranged in a criss-cross manner. In these belt layers 7, an inclination angle of the reinforcing cords with respect to the tire circumferential direction is set in a range, for example, from 10° to 60°. Although not employed in the pneumatic tire of FIG. 1, in the embodiment of present technology, a belt reinforcing layer (not illustrated) can be additionally provided on the outer circumferential side of the belt layers 7. When the belt reinforcing layer is provided, the belt reinforcing layer includes, for example, an organic fiber cord oriented in the tire circumferential direction. An angle of the organic fiber cord with respect to the tire circumferential direction can be set to, for example, from 0° to 5°.

A tread rubber layer 11 is disposed on an outer circumferential side of the carcass layer 4 and the belt layers 7 in the tread portion 1. A side rubber layer 12 is disposed on an outer circumferential side of the carcass layer 4 (outward in the tire width direction) in the sidewall portions 2. A rim cushion rubber layer 13 is disposed on the outer circumferential side of the carcass layer 4 (outward in the tire width direction) in the bead portions 3. The tread rubber layer 11 may have a structure in which two types of rubber layers (a cap tread rubber layer and an undertread rubber layer) with differing physical properties are layered in the tire radial direction.

The embodiment of the present technology may be applied to such a general pneumatic tire; however, the cross-sectional structure thereof is not limited to the basic structure described above. Note that the embodiment according to the present technology mainly intends to be used as a heavy duty pneumatic tire. In this case, as the tread rubber layer 11, a rubber composition having JIS-A hardness of preferably from 61 to 70 and more preferably from 61 to 65, and a modulus at 100% elongation of preferably from 2.0 MPa to 3.0 MPa, and more preferably from 2.0 MPa to 2.8 MPa is used.

Figure 2:
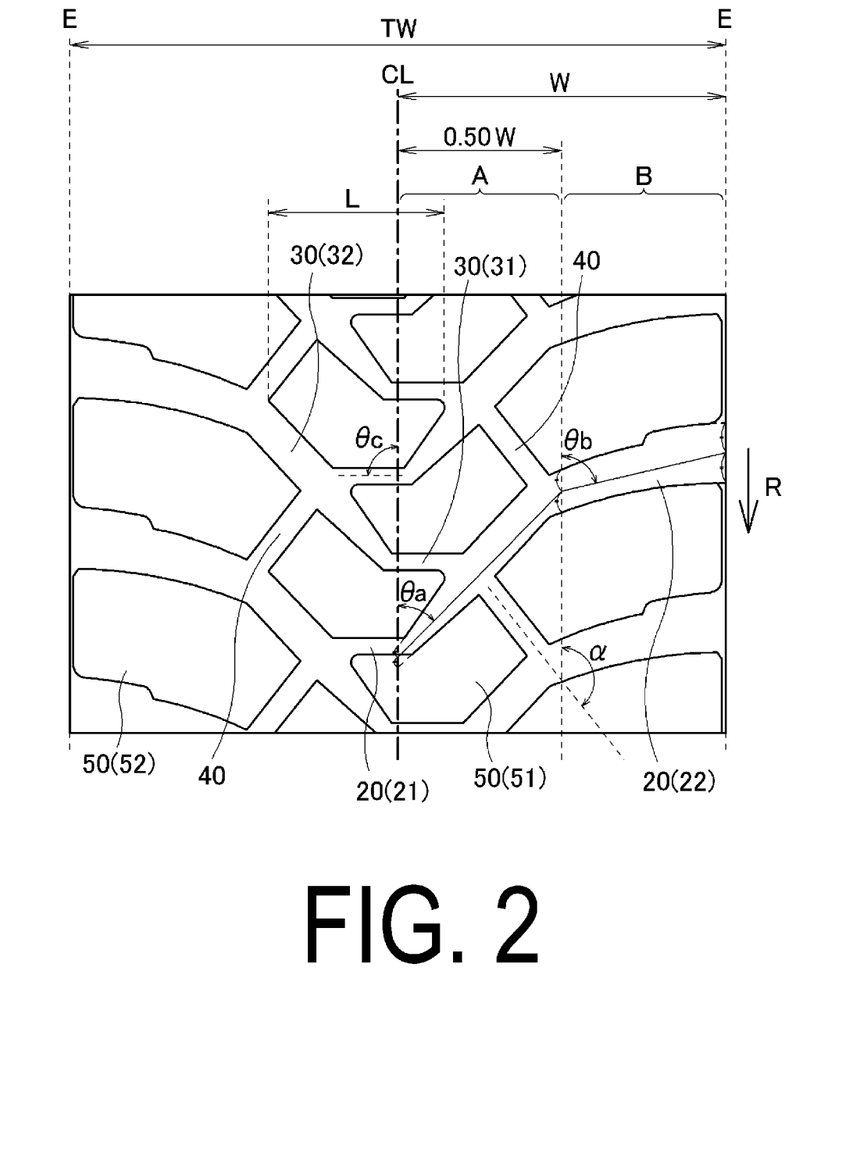
FIG. 2 is a front view illustrating a tread surface of the pneumatic tire according to the embodiment of the present technology.

As illustrated in FIG. 2, lug grooves 20 (may be referred to as "lug grooves 20 on one side" in the following description) and lug groove 30 (may be referred to as "lug grooves 30 on the other side" in the following description) are provided on a surface of the tread portion 1 of the pneumatic tire according to the embodiment of the present technology. The lug groove 20 extends from the tread edge E on one side (the right side in the drawing) of the tire equator CL inward in the tire width direction and intersects with the tire equator CL. The lug groove 30 extends from the tread edge E on the other side (the left side in the drawing) of the tire equator CL inward in the tire width direction and intersects with the tire equator CL. The plurality of lug grooves 20 on the one side and the plurality of lug grooves 30 on the other side are provided.

The lug grooves 20, 30 include first groove portions 21, 31 that intersect with the tire equator CL and extend along the tire width direction, and second groove portions 22, 32 that are inclined from one ends of the first groove portions 21, 31 at an angle smaller than that of the first groove portions 21, 31 with respect to the tire circumferential direction and extend up to the tread edges E, respectively. Specifically, the lug groove 20 on the one side includes the first groove portion 21 and the second groove portion 22. The first groove portion 21 intersects with the tire equator CL and extends along the tire width direction. The second groove portion 22 is inclined from the one end of the first groove portion 21 (the end portion on the one side (the right side in the drawing) of the tire equator) at the angle smaller than that of the first groove portion 21 with respect to the tire circumferential direction and extends up to the tread edge E. Similarly, the lug groove 30 on the other side includes the first groove portion 31 and the second groove portion 32. The first groove portion 31 intersects with the tire equator CL and extends along the tire width direction. The second groove portion 32 is inclined from the one end of the first groove portion 31 (the end portion on the other side (the left side in the drawing) of the tire equator) at the angle smaller than that of the first groove portion 31 with respect to the tire circumferential direction and extends up to the tread edge E.

The lug grooves 20 on the one side and the lug grooves 30 on the other side are arranged in the tire circumferential direction in alternation one by one. Note that, as described above, since the lug grooves 20, 30 basically extend in the mutually opposite directions from the tire equator CL, the first groove portions 21 of the lug grooves 20 on the one side and the first groove portions 31 of the lug grooves 30 on the other side are disposed in alternation in the tire circumferential direction on the tire equator CL. Meanwhile, the second groove portions 22 of the lug grooves 20 on the one side are arranged with intervals in the tire circumferential direction on the one side of the tire equator CL, and the second groove portions 32 of the lug grooves 30 on the other side are arranged with intervals in the tire circumferential direction on the other side of the tire equator CL. In the embodiment of the present technology, as long as the first groove portions 21, 31 are mutually arranged in alternation to be adjacent on the tire equator CL, the lug grooves 20, 30 are regarded as being arranged in alternation unless otherwise specified.

The other ends of the first groove portions 21, 31 of the respective lug grooves 20, 30 communicate with the second groove portions 32, 22 of the other lug grooves 30, 20 adjacent in the tire circumferential direction. In other words, the first groove portion 21 of the lug groove 20 on the one side communicates with the second groove portion 32 of the lug groove 30 on the other side adjacent in the tire circumferential direction, and the first groove portion 31 of the lug groove 30 on the other side communicates with the second groove portion 22 of the lug groove 20 on the one side adjacent in the tire circumferential direction.

The first groove portions 21, 31 of the respective lug grooves 20, 30 are located on a stepping side with respect to the end portions on the tread edge E side of the respective lug grooves 20, 30. That is, the pneumatic tire of the embodiment of the present technology is a tire in which a rotation direction R is designated. Meanwhile, the respective lug grooves 20, 30 have a shape inclined in a direction opposite to the rotation direction R from the tire equator CL side outward in the tire width direction as the entire groove.

When a distance from the tire equator CL to the tread edge E in the tire width direction is denoted as W, a region between a position separated by 0.50 W in the tire width direction from the tire equator CL and the tire equator CL is referred to as an inner region A, and a region between a position separated by 0.50 W in the tire width direction from the tire equator CL and the tread edge E is referred to as an outer region B, in the respective lug grooves 20, 30, the second groove portions 22, 32 are curved or bent such that an average angle θa of the second groove portions 22, 32 with respect to the tire circumferential direction in the inner region A becomes smaller than an average angle θb of the second groove portions 22, 32 with respect to the tire circumferential direction in the outer region B. In other words, the second groove portions 22, 32 of the lug grooves 20, 30 curve smoothly so that the inclination angles with respect to the tire circumferential direction gradually decrease from the tread edge E side toward the tire equator CL side, or are bent having at least one bend point.

Note that the average angle of the second groove portions 22, 32 of the lug grooves 20, 30 can be obtained as an angle formed by a straight line connecting the center points in groove width directions of the lug grooves 20, 30 at boundary positions of the respective regions and the tire circumferential direction. Note that, as illustrated, on the tire equator CL and the tread edge E, the center point of an extension line of the second groove portion 22, 32 drawn to the tire equator CL or the tread edge E on the tire equator CL or the tread edge E is used.

In the embodiment of the present technology, in addition to the lug grooves 20, 30, circumferential narrow grooves 40 are provided. The circumferential narrow groove 40 extends along the tire circumferential direction so as to connect the second groove portions adjacent in the tire circumferential direction on the one side of the tire equator CL, that is, the second groove portions 22 of the lug grooves 20 on the one side adjacent in the tire circumferential direction on the one side of the tire equator CL, or the second groove portions 32 of the lug grooves 30 on the other side adjacent in the tire circumferential direction on the other side of the tire equator CL.

The circumferential narrow groove 40 is a groove having a groove width smaller than those of the lug grooves 20, 30. Specifically, the lug grooves 20, 30 have the groove widths, for example, from 5 mm to 30 mm, and a groove depth of, for example, from 8 mm to 25 mm. In particular, when the tire is the heavy duty pneumatic tire, the groove depth is preferably, for example, from 15 mm to 25 mm. In contrast to this, the circumferential narrow groove 40 has a groove width, for example, from 7 mm to 11 mm, and a groove depth, for example, from 15 mm to 20 mm.

The lug grooves 20, 30 and the circumferential narrow grooves 40 partition a plurality of blocks 50. Among the plurality of blocks 50, a block positioned on the tire equator CL side with respect to the circumferential narrow groove 40 is referred to as a center block 51 and a block positioned on the tread edge E side with respect to the circumferential narrow groove 40 is referred to as a shoulder block 52. At least a part of the center blocks 51 are present on the tire equator CL by the above-described groove shape. The center block 51 has the maximum length L in the tire width direction set to from 25% to 35% of a development width TW.

Since a tread pattern is configured as described above, while the traction performance on unpaved roads is improved, low noise performance can be improved. In other words, the first groove portions 21, 31 extending along the tire width direction are disposed at or near the tire equator CL where a contribution to traction performance is large and the first groove portions 21, 31 communicate with the second groove portions 32, 22 of the other lug grooves. Accordingly, traction performance can be efficiently improved. Additionally, the second groove portions 22, 32 that curve or are bent as described above allow increasing groove lengths. This allows improving traction performance and suppressing air column resonance. Furthermore, because the maximum width of the center blocks 51 is appropriately ensured, block rigidity can be sufficiently ensured, and good traction performance can be exhibited. Additionally, providing the circumferential narrow grooves 40 disperses noise through the circumferential narrow grooves 40, thereby ensuring improving low noise performance. Additionally, the circumferential narrow grooves 40 allow adding a groove component in the tire circumferential direction, and thus a lateral displacement of the tire at traction is reduced and stability can be improved.

At this time, the lug grooves 20, 30 not having the above-described shape makes the groove shape inappropriate, thereby failing to ensure the above-described effects. In particular, when the first groove portions 21, 31 intersecting with the tire equator CL and extending along the tire width direction are not provided, traction performance cannot be sufficiently improved. When a magnitude relationship between the average angles θa, θb of the second groove portions 22, 32 is reversed, the curved or bent shape of the second groove portions 22, 32 becomes inappropriate, and the effect of improving traction performance cannot be sufficiently obtained. The absence of the circumferential narrow grooves 40 fails to add the groove component in the circumferential direction. When the maximum length L in the tire width direction of the center block 51 is less than 25% of the development width TW, the rigidity of the center block 51 is decreased and traction performance cannot be sufficiently improved. The maximum length L in the tire width direction of the center block 51 in excess of 35% of the development width TW results in the excessively large center block 51. This possibly generates pattern noise caused by the center block 51 and low noise performance is possibly deteriorated.

As described above, the first groove portions 21, 31 are provided to ensure mainly the groove component in the tire width direction at or near the tire equator CL where the contribution to traction performance is large. Accordingly, the first groove portions 21, 31 preferably extend in a direction substantially perpendicular to the tire circumferential direction. Specifically, an angle θc of the first groove portions 21, 31 with respect to the tire circumferential direction is preferably from 80° to 100°. This allows efficiently improving traction performance by the first groove portions 21, 31. When the angle θc of the first groove portions 21, 31 is less than 80° or greater than 100°, the inclination of the first groove portions 21, 31 with respect to the tire width direction increases and the groove component in the tire width direction cannot be sufficiently ensured, and thus the effect of improving traction performance is limited.

While the angles of the second groove portions 22, 32 in the respective regions can be set as appropriate according to performance regarded important in the tire, the average angle θa of the second groove portions 22, 32 with respect to the tire circumferential direction in the inner region A is preferably set to be from 35° to 45°, and the average angle θb of the second groove portions 22, 32 with respect to the tire circumferential direction in the outer region B is preferably set to be from 70° to 85°. Accordingly, the angles of the second groove portions 22, 32 in the respective portions become good and the curved or bent shapes of the second groove portions 22, 32 become good. Accordingly, lug groove lengths are increased, which is advantageous in suppressing air column resonance while improving traction performance. The average angle θa of the second groove portions 22, 32 of less than 35° decreases the groove component in the tire width direction, and this makes it difficult to sufficiently improve traction performance. When the average angle θa of the second groove portions 22, 32 exceeds 45°, a difference with the average angle θb becomes small, the second groove portions 22, 32 cannot be sufficiently bent or curved, and the lug groove lengths do not sufficiently increase, making it difficult to sufficiently improve traction performance. When the average angle θb of the second groove portions 22, 32 is less than 70°, the difference with the average angle θa becomes small, the second groove portions 22, 32 cannot be sufficiently bent or curved, and the lug groove lengths do not sufficiently increase, making it difficult to sufficiently improve traction performance. When the average angle θb of the second groove portions 22, 32 exceeds 85°, the difference with the average angle θa becomes large, and the second groove portions 22, 32 are curved or bent greatly, making it difficult to ensure the good groove shapes.

As described above, while the circumferential narrow groove 40 is a groove that connects the second groove portions 22, 32 adjacent in the tire circumferential direction on one side of the tire equator CL, the circumferential narrow groove 40 is preferably disposed at an extended position of the other ends of the first groove portions 21, 31. With such a configuration, for example, when the groove is tracked from the tread edge E on the one side, the groove goes through the first groove portion 21 from the second groove portion 22 of the lug groove 20 on the one side, crosses the lug groove 30 (second groove portion 32) on the other side, and then reaches the circumferential narrow groove 40 on the other side of the tire equator CL. These grooves are disposed in a well-balanced manner as a series of grooves, which is advantageous in improving traction performance. Note that when the groove is tracked from the tread edge E on the other side, the groove goes through the first groove portion 31 from the second groove portion 32 of the lug groove 30 on the other side, crosses the lug groove 20 (the second groove portion 22) on the one side, and then reaches the circumferential narrow groove 40 on the one side of the tire equator CL.

As described above, while the circumferential narrow groove 40 is a groove intended to add the groove component in the tire circumferential direction, the circumferential narrow groove 40 is preferably inclined appropriately with respect to the tire circumferential direction to provide the groove component in the tire width direction, in addition to the groove component in the tire circumferential direction. Therefore, the circumferential narrow grooves 40 preferably extend substantially perpendicular to the lug grooves 20, 30. Specifically, the difference between the average angle θa of the second groove portions 22, 32 with respect to the tire circumferential direction in the inner region A and an inclination angle α of the circumferential narrow groove 40 with respect to the tire circumferential direction is preferably within a range 90°±10°. This provides the good shape to the circumferential narrow groove 40 and a good balance between the groove component in the tire circumferential direction and the groove component in the tire width direction, which are advantageous in improving traction performance. When the difference between the average angle θa and the angle α is outside the range of 90°±10°, the groove component in the tire circumferential direction or the tire width direction increases and the balance between the respective groove components becomes poor, and thus the effect of improving traction performance is limited.

While the lug grooves 20, 30 may have the uniform groove depth entirely, the first groove portions 21, 31 are preferably configured to be appropriately shallower than the second groove portions 22, 32. Specifically, the groove depth of the first groove portions 21, 31 of the lug grooves 20, 30 is preferably from 65% to 75% of the groove depth of the second groove portions 22, 32. This allows increasing the rigidity of the block (center block 51) adjacent to the first groove portions 21, 31, which is advantageous in improving traction performance. When the groove depth of the first groove portions 21, 31 is less than 65% of the groove depth of the second groove portions 22, 32, the first groove portions 21, 31 become too shallow, making it difficult to sufficiently exhibit an edge effect as a groove. The groove depth of the first groove portions 21, 31 in excess of 75% of the groove depth of the second groove portions 22, 32 substantially eliminates the difference in groove depth between the first groove portions 21, 31 and the second groove portions 22, 32, and the effect brought by changing the groove depth is not sufficiently expected.

While the respective groove depths of the lug grooves 20, 30 and the circumferential narrow groove 40 can be set to be the above-described ranges, the circumferential narrow groove 40 is preferably configured to be adequately shallower than the lug grooves 20, 30. Specifically, the groove depth of the circumferential narrow groove 40 is set to be preferably from 75% to 85% of the groove depth of the second groove portions 22, 32 of the lug grooves 20, 30. By adequately shallowing the circumferential narrow groove 40 more than the second groove portions 22, 32 in this manner, the rigidity of the blocks adjacent to the circumferential narrow grooves 40 (the center block 51 and the shoulder block 52) can be increased, which is advantageous in improving traction performance. When the groove depth of the circumferential narrow groove 40 is less than 75% of the groove depth of the second groove portions 22, 32, the circumferential narrow groove 40 becomes too shallow, making it difficult to sufficiently exhibit the edge effect as a groove. The groove depth of the circumferential narrow groove 40 in excess of 85% of the groove depth of the second groove portions 22, 32 substantially eliminates the difference in groove depth between the circumferential narrow groove 40 and the second groove portions 22, 32, and the effect brought by changing the groove depth is not sufficiently expected.

Example 25 types of pneumatic tires of Conventional Example 1, Comparative Examples 1 and 2, and Examples 1 to 22 having a tire size of 315/80R22.5 and the basic structure illustrated in FIG. 1 as an example and in which the based tread pattern, the average angle θa of the second groove portion of the lug groove with respect to the tire circumferential direction in the inner region A, the average angle θb of the second groove portion of the lug groove with respect to the tire circumferential direction in the outer region B, the angle θc of the first groove portion of the lug groove with respect to the tire circumferential direction, the magnitude relationship between the average angles θa and θb, a ratio of the maximum length L of the center groove to the developed tread width TW (L/TW×100%), the position of the circumferential narrow groove, a difference between the average angle θa of the second groove portions with respect to the tire circumferential direction in the inner region and the inclination angle α of the circumferential narrow groove with respect to the tire circumferential direction (α−θa), a depth of the second groove portion of the lug groove, a ratio of the depth of the first groove portion of the lug groove to the depth of the second groove portion of the lug groove (%), a ratio of the depth of the circumferential narrow groove to the depth of the second groove portion of the lug groove (%), the hardness of the rubber composition (tread rubber) constituting the tread portion, and the modulus at 100% elongation of the rubber composition (tread rubber) constituting the tread portion were each set as shown in Tables 1 to 3 were manufactured.

The corresponding drawings numbers are described in the "tread pattern" columns in Tables 1 to 3. Note that although the pattern of Conventional Example 1 (FIG. 3) differs greatly from the pattern of FIG. 2, for example, the angles of the respective portions were made to correspond to FIG. 2 as described in the drawing to obtain values of the respective items. Although Comparative Examples 1 and 2 are patterns in which the curve or bending of the lug grooves is small, for example, values of the respective items were shown as ones corresponding to the pattern of FIG. 2 for convenience. In the "Position of circumferential narrow groove" columns in Tables 1 to 3, the case where the circumferential narrow groove was present at the extended position of the first groove portions of the lug grooves was described as "Continuous," and the case where the circumferential narrow groove was not present at the extended position was described as "Discontinuous."

These pneumatic tires were evaluated for traction performance and low noise performance according to the following evaluation methods. The results thereof are shown in Tables 1 to 3.

Traction Performance

The respective test tires were mounted on wheels having a rim size of 22.5×9.00, adjusted to have an air pressure of 850 kPa, and mounted on a drive shaft of a test vehicle (truck with an axle arrangement of 6×4). The test tires were each subjected to sensory evaluation by a test driver on a test course of a paved road surface and a test course of an unpaved road. Evaluation results are expressed as index values with Conventional Example 1 being assigned the index value of 100. Larger index values indicate excellent traction performance.

Low Noise Performance

The respective test tires were mounted on wheels having a rim size of 22.5×9.00 and mounted on a drive shaft of a test vehicle (truck with an axle arrangement of 6×4). Pass-by noise outside the vehicle was measured in accordance with the tire noise testing method specified in ECE (The United Nations Economic Commission for Europe) Regulation No. 117 Revision 2 (ECE R117-02). Specifically, the test vehicle was driven from sufficiently before a noise measurement section, and an engine was stopped immediately before the section. The maximum noise value (dB) (a noise level in a range of a frequency from 800 to 1200 Hz) in the noise measurement section during coasting driving was measured at a plurality of speeds that were provided by dividing a speed range of ±10 km/hour relative to a reference speed by approximately equal intervals of eight or greater, and the average was determined as the pass-by noise outside the vehicle. The maximum noise value dB is a sound pressure [dB(A)] measured through an A-characteristic frequency correction circuit using a stationary microphone installed at 7.5 m to a lateral side from a driving center line at an intermediate point in the noise measurement section and at a height of 1.2 m from the road surface. The evaluation results are expressed as indices using the reciprocal of the measurement values, with the Conventional Example 1 being assigned the index of 100. Larger index values indicate smaller pass-by noise outside the vehicle and better low noise performance.

TABLE 1

Figure 3:
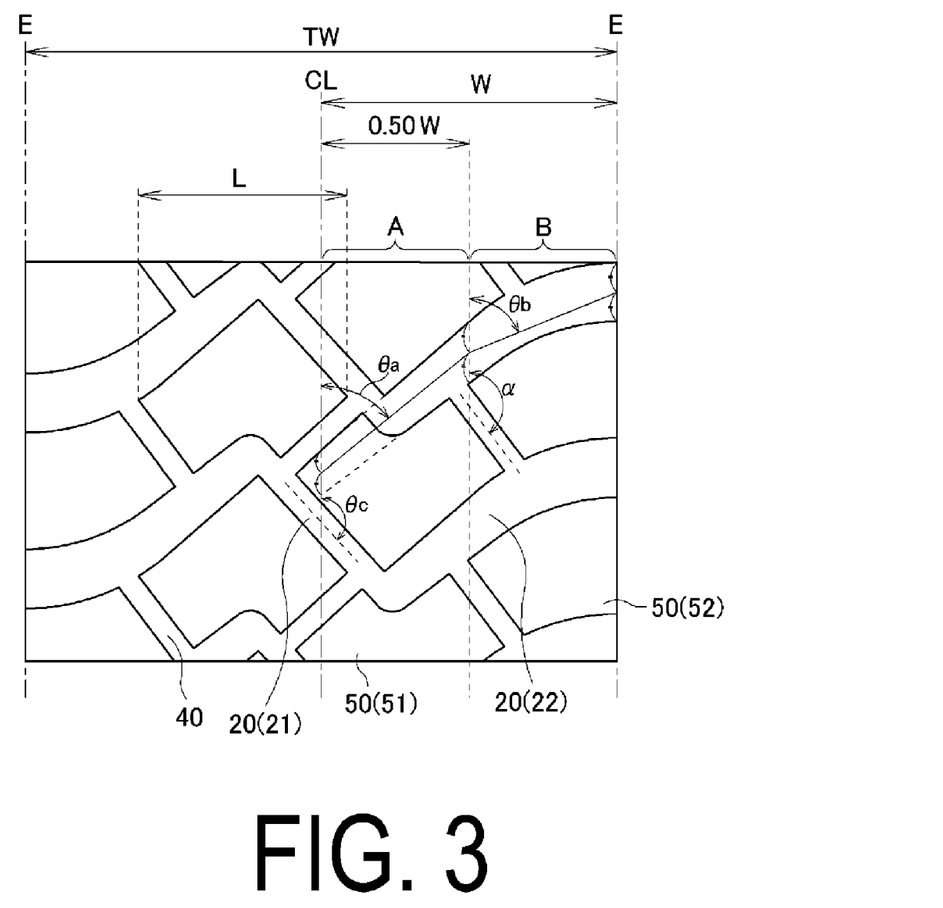
FIG. 3 is a front view illustrating an example of a tread surface of a pneumatic tire of Conventional Example.

|  |  | Conventional Example 1 | Comparative Example 1 | Comparative Example 2 | Example 1 |
| --- | --- | --- | --- | --- | --- |
| Tread pattern |  | FIG. 3 | FIG. 2 | FIG. 2 | FIG. 2 |
| θa | ° | 51 | 80 | 85 | 80 |
| θb | ° | 68 | 80 | 80 | 85 |
| θc | ° | 138 | 90 | 90 | 90 |
| Magnitude relationship between θa and θb |  | θa < θb | θa = θb | θa > θb | θa < θb |
| L/TW × 100 | % | 35 | 30 | 30 | 30 |
| Position of circumferential narrow groove |  | Discontinuous | Discontinuous | Discontinuous | Discontinuous |
| Difference (α − θa) | ° | 90 | 90 | 90 | 90 |
| Groove depth of second groove portion | mm | 22 | 22 | 22 | 22 |
| Groove depth of first groove portion | % | 40 | 40 | 40 | 40 |
| Groove depth of circumferential narrow groove | % | 70 | 70 | 70 | 70 |
| Tread rubber hardness |  | 63 | 60 | 60 | 60 |
| Modulus of tread rubber | MPa | 2.4 | 1.9 | 1.9 | 1.9 |
| Traction performance | Index value | 100 | 103 | 98 | 104 |
| Low noise performance | Index value | 100 | 97 | 100 | 102 |

|  |  | Example 2 | Example 3 | Example 4 | Example 5 |
| --- | --- | --- | --- | --- | --- |
| Tread pattern |  | FIG. 2 | FIG. 2 | FIG. 2 | FIG. 2 |
| θa | ° | 80 | 80 | 80 | 80 |
| θb | ° | 85 | 85 | 85 | 85 |
| θc | ° | 90 | 90 | 80 | 100 |
| Magnitude relationship between θa and θb |  | θa < θb | θa < θb | θa < θb | θa < θb |
| L/TW × 100 | % | 25 | 35 | 30 | 30 |
| Position of circumferential narrow groove |  | Discontinuous | Discontinuous | Discontinuous | Discontinuous |
| Difference (α − θa) | ° | 90 | 90 | 90 | 90 |
| Groove depth of second groove portion | mm | 22 | 22 | 22 | 22 |
| Groove depth of first groove portion | % | 40 | 40 | 40 | 40 |
| Groove depth of circumferential narrow groove | % | 70 | 70 | 70 | 70 |
| Tread rubber hardness |  | 60 | 60 | 60 | 60 |
| Modulus of tread rubber | MPa | 1.9 | 1.9 | 1.9 | 1.9 |
| Traction performance | Index value | 102 | 107 | 106 | 106 |
| Low noise performance | Index value | 103 | 100 | 104 | 104 |

TABLE 2

|  |  | Example 6 | Example 7 | Example 8 |
|---|---|---|---|---|
| Tread pattern |  | FIG. 2 | FIG. 2 | FIG. 2 |
| θa | ° | 45 | 50 | 35 |
| θb | ° | 80 | 80 | 80 |
| θc | ° | 90 | 90 | 90 |
| Magnitude relationship between θa and θb |  | θa < θb | θa < θb | θa < θb |
| L/TW × 100 | % | 30 | 30 | 30 |
| Position of circumferential narrow groove |  | Discontinuous | Discontinuous | Discontinuous |
| Difference (α − θa) | ° | 90 | 90 | 90 |
| Groove depth of second groove portion | mm | 22 | 22 | 22 |
| Groove depth of first groove portion | % | 40 | 40 | 40 |
| Groove depth of circumferential narrow groove | % | 70 | 70 | 70 |
| Tread rubber hardness |  | 60 | 60 | 60 |
| Modulus of tread rubber | MPa | 1.9 | 1.9 | 1.9 |
| Traction performance | Index value | 108 | 110 | 107 |
| Low noise performance | Index value | 108 | 108 | 109 |

|  |  | Example 9 | Example 10 | Example 11 |
|---|---|---|---|---|
| Tread pattern |  | FIG. 2 | FIG. 2 | FIG. 2 |
| θa | ° | 40 | 40 | 40 |
| θb | ° | 65 | 70 | 85 |
| θc | ° | 90 | 90 | 90 |
| Magnitude relationship between θa and θb |  | θa < θb | θa < θb | θa < θb |
| L/TW × 100 | % | 30 | 30 | 30 |
| Position of circumferential narrow groove |  | Discontinuous | Discontinuous | Discontinuous |
| Difference (α − 0a) | ° | 90 | 90 | 90 |
| Groove depth of second groove portion | mm | 22 | 22 | 22 |
| Groove depth of first groove portion | % | 40 | 40 | 40 |
| Groove depth of circumferential narrow groove | % | 70 | 70 | 70 |
| Tread rubber hardness |  | 60 | 60 | 60 |
| Modulus of tread rubber | MPa | 1.9 | 1.9 | 1.9 |
| Traction performance | Index value | 105 | 106 | 109 |
| Low noise performance | Index value | 112 | 111 | 109 |

|  |  | Example 12 | Example 13 | Example 14 |
|---|---|---|---|---|
| Tread pattern |  | FIG. 2 | FIG. 2 | FIG. 2 |
| θa | ° | 40 | 40 | 40 |
| θb | ° | 80 | 80 | 80 |
| θc | ° | 90 | 90 | 90 |
| Magnitude relationship between θa and θb |  | θa < θb | θa < θb | θa < θb |
| L/TW × 100 | % | 30 | 30 | 30 |
| Position of circumferential narrow groove |  | Continuous | Continuous | Continuous |
| Difference (α − θa) | ° | 90 | 80 | 100 |
| Groove depth of second groove portion | mm | 22 | 22 | 22 |
| Groove depth of first groove portion | % | 40 | 40 | 40 |
| Groove depth of circumferential narrow groove | % | 70 | 70 | 70 |
| Tread rubber hardness |  | 60 | 60 | 60 |
| Modulus of tread rubber | MPa | 1.9 | 1.9 | 1.9 |
| Traction performance | Index value | 111 | 114 | 114 |
| Low noise performance | Index value | 110 | 113 | 113 |

TABLE 3

|  |  | Example 15 | Example 16 | Example 17 | Example 18 |
|---|---|---|---|---|---|
| Tread pattern |  | FIG. 2 | FIG. 2 | FIG. 2 | FIG. 2 |
| θa | ° | 40 | 40 | 40 | 40 |
| θb | ° | 80 | 80 | 80 | 80 |
| θc | ° | 90 | 90 | 90 | 90 |
| Magnitude relationship between θa and θb |  | θa < θb | θa < θb | θa < θb | θa < θb |
| L/TW × 100 | % | 30 | 30 | 30 | 30 |
| Position of circumferential narrow groove |  | Continuous | Continuous | Continuous | Continuous |

TABLE 3-continued

|  |  |  |  |  |  |
|---|---|---|---|---|---|
| Difference (α − θa) | ° | 90 | 90 | 90 | 90 |
| Groove depth of second groove portion | mm | 15 | 25 | 22 | 22 |
| Groove depth of first groove portion | % | 40 | 40 | 65 | 75 |
| Groove depth of circumferential narrow groove | % | 70 | 70 | 70 | 75 |
| Tread rubber hardness |  | 60 | 60 | 60 | 60 |
| Modulus of tread rubber | MPa | 1.9 | 1.9 | 1.9 | 1.9 |
| Traction performance | Index value | 114 | 114 | 117 | 114 |
| Low noise performance | Index value | 114 | 112 | 113 | 109 |

|  |  | Example 19 | Example 20 | Example 21 | Example 22 |
|---|---|---|---|---|---|
| Tread pattern |  | FIG. 2 | FIG. 2 | FIG. 2 | FIG. 2 |
| θa | ° | 40 | 40 | 40 | 40 |
| θb | ° | 80 | 80 | 80 | 80 |
| θc | ° | 90 | 90 | 90 | 90 |
| Magnitude relationship between θa and θb |  | θa < θb | θa < θb | θa < θb | θa < θb |
| L/TW × 100 | % | 30 | 30 | 30 | 30 |
| Position of circumferential narrow groove |  | Continuous | Continuous | Continuous | Continuous |
| Difference (α − θa) | ° | 90 | 90 | 90 | 90 |
| Groove depth of second groove portion | mm | 22 | 22 | 22 | 22 |
| Groove depth of first groove portion | % | 70 | 70 | 70 | 70 |
| Groove depth of circumferential narrow groove | % | 85 | 85 | 85 | 80 |
| Tread rubber hardness |  | 60 | 61 | 65 | 63 |
| Modulus of tread rubber | MPa | 1.9 | 2 | 2.8 | 2.4 |
| Traction performance | Index value | 116 | 117 | 120 | 118 |
| Low noise performance | Index value | 111 | 113 | 109 | 111 |

As can be seen from Tables 1 to 3, all of Examples 1 to 22 improved traction performance and low noise performance compared to those of Conventional Example 1.

On the other hand, in Comparative Example 1, the average angle of the second groove portions of the lug grooves was constant in all regions, and the lug grooves were not curved or bent, so low noise performance was deteriorated. In Comparative Example 2, the shape of the lug grooves was inappropriate and the angle of the lug grooves gradually increased to the tire center. Accordingly, the effects of improving traction performance and low noise performance were not obtained.

The invention claimed is:

1. A pneumatic tire in which a rotation direction is designated, comprising:
   a tread portion that extends in a tire circumferential direction and forms an annular shape;
   a pair of sidewall portions disposed on both sides of the tread portion;
   a pair of bead portions disposed inward of the sidewall portions in a tire radial direction;
   lug grooves that extend inward in a tire width direction from a tread edge on one side of a tire equator and intersect with the tire equator and lug grooves that extend inward in the tire width direction from a tread edge on an other side of the tire equator and intersect with the tire equator being arranged in alternation in a tire circumferential direction on an outer surface of the tread portion;
   each of the lug grooves include a first groove portion and a second groove portion, the first groove portion intersecting with the tire equator and extending along the tire width direction, the second groove portion being inclined from one end of the first groove portion at an angle with respect to the tire circumferential direction smaller than an angle of the first groove portion with respect to the tire circumferential direction and extending to the tread edge, the first groove portion having another end communicating with the second groove portion of the lug groove adjacent in the tire circumferential direction, the first groove portion being located on a stepping side with respect to an end portion on the tread edge side of the lug groove;
   when a distance from the tire equator to the tread edge is denoted as W, a region between a position separated by 0.50 W in the tire width direction from the tire equator and the tire equator is referred to as an inner region, and a region between the position separated by 0.50 W in the tire width direction from the tire equator and the tread edge is referred to as an outer region, the second groove portions being curved or bent such that an average angle of the second groove portions with respect to the tire circumferential direction in the inner region becomes smaller than an average angle of the second groove portions with respect to the tire circumferential direction in the outer region; and
   circumferential narrow grooves that connect mutual second groove portions adjacent in the tire circumferential direction on the one side or the other side of the tire equator being formed, center blocks being defined at positions intersecting with the tire equator by the lug grooves and the circumferential narrow grooves, a maximum length in the tire width direction of the center block being from 25% to 35% of a tread width; wherein
   the center blocks extend continuously from the tire equator to the circumferential narrow grooves and shoulder blocks are defined extending continuously from the circumferential narrow grooves to a tread edge;

a groove depth of the first groove portion of the lug groove is from 65% to 75% of a groove depth of the second groove portion, and a groove depth of each of the circumferential narrow grooves is from 75% to 85% of a groove depth of the second groove portion of the lug grooves;

an angle of the first groove portion at the tire equator with respect to the tire circumferential direction is from 80° to 100°; and groove walls defining the first groove portion are parallel to one another at the tire equator.

2. The pneumatic tire according to claim 1, wherein the average angle of the second groove portion with respect to the tire circumferential direction in the inner region is from 35° to 45°, and the average angle of the second groove portion with respect to the tire circumferential direction in the outer region is from 70° to 85°.

3. The pneumatic tire according to claim 2, wherein one of the circumferential narrow grooves is present at an extended position of the first groove portion, and a difference between an average angle of the second groove portion with respect to the tire circumferential direction in the inner region and an inclination angle of the circumferential narrow groove with respect to the tire circumferential direction is within a range 90°±10°.

4. The pneumatic tire according to claim 3, wherein the second groove portion of each of the lug groove has a groove depth from 15 mm to 25 mm.

5. The pneumatic tire according to claim 4, wherein a tread rubber constituting the tread portion has JIS-A hardness from 61 to 70 and a modulus at 100% elongation from 2.0 MPa to 3.0 MPa.

6. The pneumatic tire according to claim 1, wherein one of the circumferential narrow groove is present at an extended position of the first groove portion, and a difference between an average angle of the second groove portion with respect to the tire circumferential direction in the inner region and an inclination angle of the circumferential narrow groove with respect to the tire circumferential direction is within a range 90°±10°.

7. The pneumatic tire according to claim 1, wherein the second groove portion of each of the lug groove has a groove depth from 15 mm to 25 mm.

8. The pneumatic tire according to claim 1, wherein a tread rubber constituting the tread portion has JIS-A hardness from 61 to 70 and a modulus at 100% elongation from 2.0 MPa to 3.0 MPa.

9. The pneumatic tire according to claim 1, wherein the angle of the first groove portion at the tire equator with respect to the tire circumferential direction is from 80° to 90°.

10. A pneumatic tire in which a rotation direction is designated, comprising:
a tread portion that extends in a tire circumferential direction and forms an annular shape;
a pair of sidewall portions disposed on both sides of the tread portion;
a pair of bead portions disposed inward of the sidewall portions in a tire radial direction;
lug grooves that extend inward in a tire width direction from a tread edge on one side of a tire equator and intersect with the tire equator and lug grooves that extend inward in the tire width direction from a tread edge on an other side of the tire equator and intersect with the tire equator being arranged in alternation in a tire circumferential direction on an outer surface of the tread portion;

each of the lug grooves include a first groove portion and a second groove portion, the first groove portion intersecting with the tire equator and extending along the tire width direction, the second groove portion being inclined from one end of the first groove portion at an angle with respect to the tire circumferential direction smaller than an angle of the first groove portion with respect to the tire circumferential direction and extending to the tread edge, the first groove portion having another end communicating with the second groove portion of the lug groove adjacent in the tire circumferential direction, the first groove portion being located on a stepping side with respect to an end portion on the tread edge side of the lug groove;

when a distance from the tire equator to the tread edge is denoted as W, a region between a position separated by 0.50 W in the tire width direction from the tire equator and the tire equator is referred to as an inner region, and a region between the position separated by 0.50 W in the tire width direction from the tire equator and the tread edge is referred to as an outer region, the second groove portions being curved or bent such that an average angle of the second groove portions with respect to the tire circumferential direction in the inner region becomes smaller than an average angle of the second groove portions with respect to the tire circumferential direction in the outer region; and circumferential narrow grooves that connect mutual second groove portions adjacent in the tire circumferential direction on the one side or the other side of the tire equator being formed, center blocks being defined at positions intersecting with the tire equator by the lug grooves and the circumferential narrow grooves, a maximum length in the tire width direction of the center block being from 25% to 35% of a tread width;

wherein the second groove portion of each of the lug grooves has a groove depth from 18 mm to 25 mm; and the center blocks extend continuously from the tire equator to the circumferential narrow grooves and shoulder blocks are defined extending continuously from the circumferential narrow grooves to a tread edge.

11. The pneumatic tire according to claim 10, wherein the maximum length in the tire width direction of the center block is from 25% to 30% of the tread width.

12. The pneumatic tire according to claim 10, wherein a groove depth of the first groove portion of the lug groove is from 65% to 75% of a groove depth of the second groove portion, and a groove depth of each of the circumferential narrow grooves is from 75% to 85% of a groove depth of the second groove portion of the lug grooves.

13. The pneumatic tire according to claim 10, wherein the second groove portion of each of the lug grooves has a groove depth from 21 mm to 25 mm.

* * * * *